May 1, 1928.
A. WEILAND
VEHICLE BUMPER
Filed March 18, 1926
1,668,096
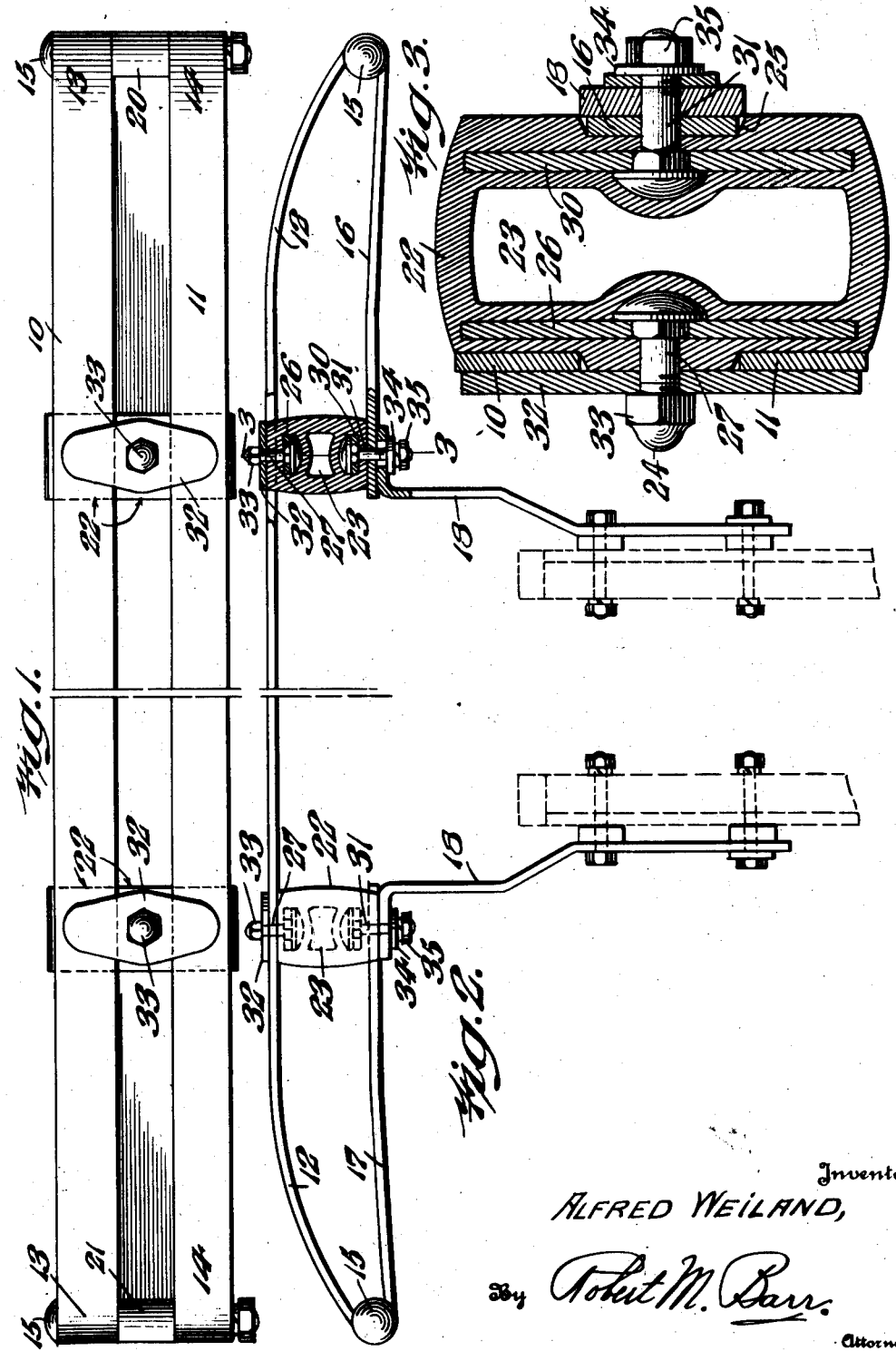
Inventor
ALFRED WEILAND,
By Robert M. Barr.
Attorney Patented May 1, 1928.

1,668,096

UNITED STATES PATENT OFFICE.

ALFRED WEILAND, OF NESHANIC, NEW JERSEY, ASSIGNOR TO PNEUMATIC APPLIANCES CORPORATION, OF NEW YORK, N. Y., A CORPORATION OF DELAWARE.

VEHICLE BUMPER.

Application filed March 18, 1926. Serial No. 95,636.

The present invention relates to vehicle bumpers and more particularly to a combined spring and cushion bumper.

Some of the objects of the present invention are to provide an improved shock absorbing bumper; to provide means for receiving the direct impact of a blow and transmitting the shock of such impact materially lessened to an auxiliary cushioning element or elements to further absorb the shock in order to prevent damage to the vehicle to which the bumper is attached; to provide means for supplementing the action of a spring bar type of bumper whereby impact shocks are reduced to a minimum before reaching the vehicle frame; to provide an improved bumper formed of two different but co-operating shock absorbing devices; and to provide other improvements as will hereinafter appear.

In the accompanying drawings Fig. 1 represents a front elevation of a bumper embodying one form of the present invention; Fig. 2 represents a plan of the same; Fig. 3 represents a section on line 3—3 of Fig. 2.

Referring to the drawings, the present invention consists of two impact bars 10 and 11 arranged in superposed edge to edge relation but spaced one from the other. These bars are preferably made of spring steel to act as resilient shock resisting means, and this resilient property is increased by the generally bowed contour of the bars due to the rearwardly curved end portions 12. The juxtaposed ends of the bars 10 and 11 are formed with eyes 13 and 14 to receive fastening bolts 15, one for each pair of the aforesaid eyes, and the construction is such that the bar eyes are free to turn relatively to the bolts 15.

For supporting the impact bars 10 and 11, the present form of the invention employs two rear bars 16 and 17 located substantially in a plane parallel to the main or body portion of the impact bars 10 and 11 and fastened respectively at their outer ends to the fastening bolts 15, and at their inner ends respectively to rigid arms 18 for connection to the frame of the vehicle upon which the bumper is to be mounted. The rear bar 16 is provided with an eye 20 to receive the bolt 15 and the eye 20 seats snugly but relatively movable between the upper and lower eyes of the impact bars on that particular bolt 15. In the same manner the bar 17 has an eye 21 similarly mounted with respect to the other bolt 15.

For the purpose of supplementing the absorption of shocks received by the bars 10 and 11 and so lessening them as to be generally inappreciable in effect upon the vehicle frame, one or more expansible and inherently resilient cushioning members 22 are interposed between the bars 10 and 11 and the parts supported from the vehicle frame. In the preferred construction two of such cushioning members 22 are provided, each comprising a body of rubber or any other suitable resilient material provided with a chamber 23 preferably containing air which is compressed therein during the molding of the aforesaid body. Generally the vertical dimensions of the body correspond substantially with the width of the bumper as considered transverse to the impact bars 10 and 11 and the space therebetween. Preferably in the molding of the body 22 a boss 24 is formed at the front to fit snugly between the impact bars 10 and 11, while at the rear a recess 25 is formed to provide a seat for the rear bar, either 16 or 17 in the present case according to which body 22 is being considered.

Also in the molding of the body 22 provision is made for re-enforcing the side structure of the body and for making it fast in operating position by molding a metal plate 26 in the front wall together with a fastening stud 27 and molding a second metal plate 30 in the rear wall also with a fastening stud 31. The stud 27 projects through the boss 24 to receive a clamping plate 32 to be held by the stud nut 33, and the length of the plate 32 is such as to overlap the front faces of the two impact bars 10 and 11. The stud 31 projects rearwardly through the recess 25, traversing successively the adjacent bumper rear bar and the outwardly turned end of the connecting arm 18, where it terminates in a washer 34 and nut 35.

From the foregoing construction it will be seen that the impact bars 10 and 11 have a central and two end portions substantially unrestricted for flexing under impacts while at points substantially in alignment respectively with the sides of the vehicle frame auxiliary bracing and absorption members are utilized to exert a more positive yielding resistance to the impacts transmitted from the bars 10 and 11. Thus the general effect of a shock is to cause its initial thrust to be taken up by the bars 10 and 11, while further shock producing thrust is transmitted to the expansible members 22 and there absorbed by lateral distention caused by the compression of the medium molded into the chambers 23. Furthermore, since the impact bars 10 and 11 are intermediately connected to rigid supports by flexible shock resisting means, it is evident that provision is made for lateral yielding of one part of the bumper with respect to another so that end or laterally received impacts are also effectively absorbed. Another important advantage of the present construction contributing to the desired end is that the pneumatic cushion structure not only causes the impact to be gradually absorbed but allows extreme deflection of the impact bars without danger of the bars taking a permanent set. In other words, the impact bars always return to their original shape and position and deformation under impacts does not occur.

Having thus described my invention, I claim:

1. In combination with a vehicle frame, a bumper impact bar of spring material arranged to extend across an end of a vehicle, means connecting the ends of said impact bar to said vehicle frame, and a pair of pneumatic members interposed between said impact bar and said connecting means whereby shocks to said impact bar are gradually absorbed.

2. In combination with a vehicle frame, a pair of impact bars arranged in superposed edge to edge relation and having rearwardly curved ends respectively, supports carried by said vehicle frame, means connecting said supports with the ends of said impact bars, and a pair of hollow resilient members interposed between said connecting means and said impact bars.

3. In combination with a vehicle frame, a pair of impact bars arranged in superposed edge to edge relation and having rearwardly curved ends respectively, supports carried by said vehicle frame, means connecting said supports with the ends of said impact bars, a pair of pneumatic members, and separate means for respectively clamping opposite sides of said members to said impact bars and to said connecting means.

4. In combination with a vehicle frame, a pair of impact bars arranged in superposed edge to edge relation and having rearwardly curved ends respectively, bolts connecting the juxtaposed ends of said bars, a rear bar connected to each bolt, bars connected to the free ends respectively of said rear bars and mounted on said vehicle frame, and a pneumatic member connected between each rear bar and said impact bars.

5. In combination with a vehicle frame, a pair of impact bars arranged in superposed edge to edge relation to provide a space therebetween, said bars having rearwardly curved ends respectively, bolts connecting the juxtaposed ends of said bars, a rear bar connected to each bolt between the ends of said impact bars, bars connected to the free ends respectively of said rear bars and mounted on said vehicle frame, a pneumatic member interposed between each rear bar and said impact bars, said members having a portion projecting between said impact bars, and fastening means for attaching said members to said impact bars and to said rear bars.

6. A bumper for vehicles comprising a rear bar construction arranged to be supported on a vehicle, an impact bar, cushioning rubber operatively associated with said rear bar construction to resiliently resist movement of said rear bar construction toward and away from said impact bar, and means cooperating with said rubber for maintaining said rubber in operative association with said impact bar and said rear bar construction.

Signed at Philadelphia, county of Philadelphia, State of Pennsylvania, this 16th day of March, 1926.

ALFRED WEILAND.